Oct. 24, 1967    P. BARATOFF ET AL    3,348,796
SPHERICAL TYPE OF ALL-DIRECTIONAL FRICTIONAL DAMPER
Filed Oct. 23, 1965    4 Sheets-Sheet 1

INVENTORS.
PAUL BARATOFF,
NICHOLAS F. KFOURY &
BILLY Y. K. MUI their ATTORNEYS

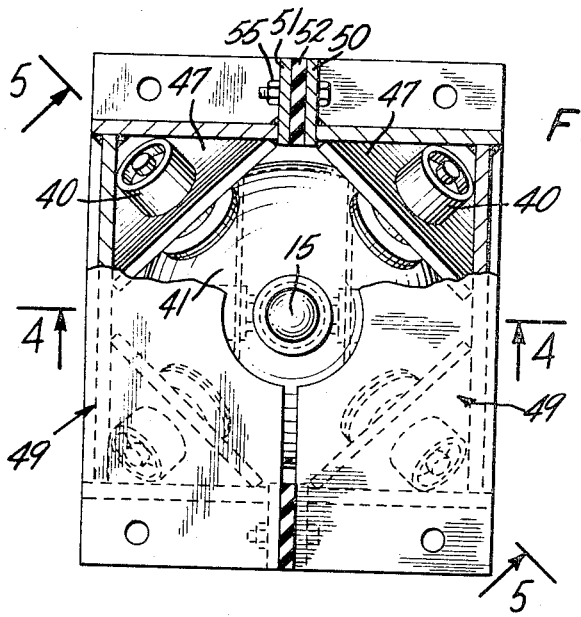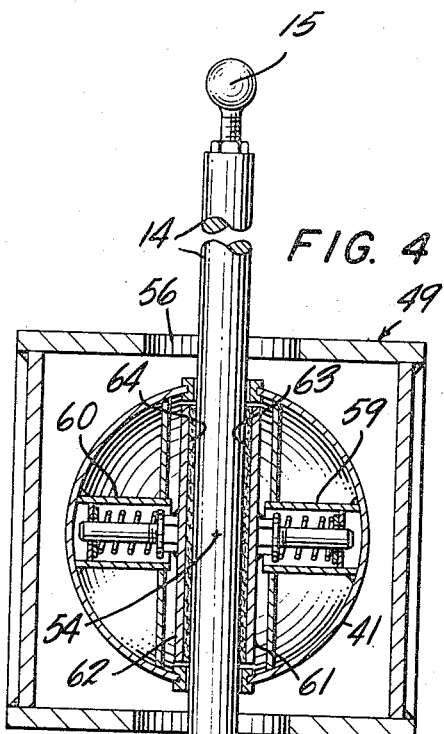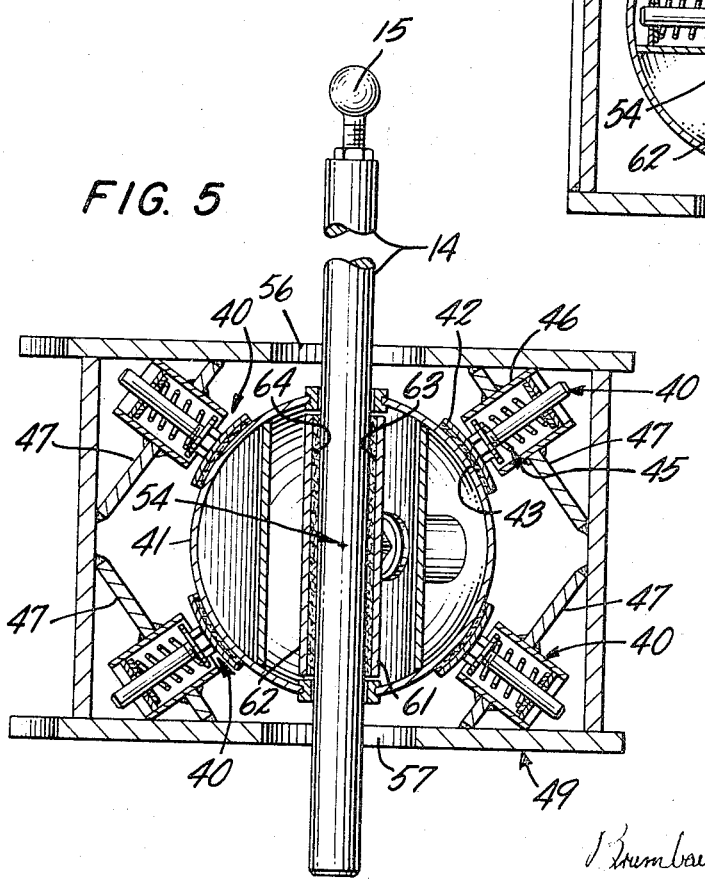

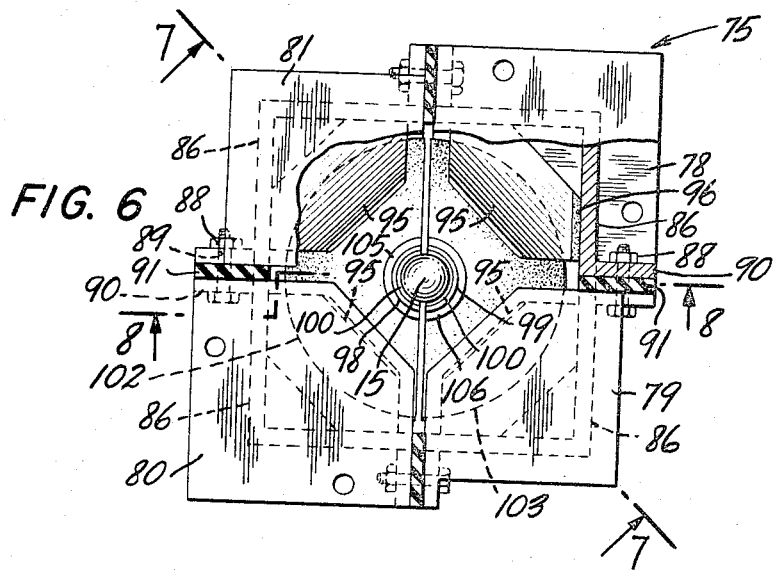

United States Patent Office 3,348,796
Patented Oct. 24, 1967

3,348,796
SPHERICAL TYPE OF ALL-DIRECTIONAL FRICTIONAL DAMPER
Paul Baratoff, Jackson Heights, Nicholas F. Kfoury, Manorhaven, and Billy Y. K. Mui, Astoria, N.Y., assignors to Korfund Dynamics Corporation, Long Island City, N.Y., a corporation of New York
Filed Oct. 23, 1965, Ser. No. 503,713
11 Claims. (Cl. 248—20)

The present invention relates to vibration dampers and, more particularly, to a novel and improved apparatus for damping vibrations in all directions with constant force.

In conventional all-directional friction or constant force dampers, damping force is provided in two generally perpendicular directions by separate spring-biased friction elements, one of which is cylindrical and another of which is planar in configuration.

In accordance with the invention, novel and improved forms of vibration dampers are provided, comprising the combination of an elongated rigid rod having one end pivotally mounted about and the remainer thereof freely depending from a fixed point on a vibratile mass, the vibrations of which are to be damped relative to a fixed reference base on which it is resiliently supported, and a generally spherical damping means enclosing and diametrically receiving a longitudinal extent of the rod for frictionally damping both lateral rocking and axial displacement of the rod relative to the fixed reference base. The rod has a longitudinal axis adapted to assume a predetermined position in space relative to the vibratile mass when the vibratile mass is at rest and is susceptible of angular displacement from the predetermined spatial position in any plane passing through and including the predetermined spatial position upon lateral displacement of the vibratile mass relative to the fixed reference base. The spherical damping means is susceptible of rotation about a radially inward center of rotation and is adapted to engage at least two spaced-apart points on the longitudinal extent of the rod respectively positioned on opposite sides of the center of rotation. Means are provided for frictionally restraining rotation of said spherical damping means about its center of rotation to dampen angular displacement or movement of the rod from its predetermined at rest position.

In a preferred embodiment of the invention, the point of attachment of the damper rod to the vibratile mass is positioned in a plane passing through the "elastic center" of the spring means supporting the vibratile mass relative to the reference base, thereby restraining rotative forces upon the supporting springs under the combined action of axial and lateral shock loads.

Further, in accordance with the invention, the use of spherical damping means permits the combination of support spring and damper on a single spring-damper mount with damping forces acting at the "elastic center" of a single spring.

For a more complete understanding of the invention, reference may be had to the following detailed description, taken in conjunction with the figures of the accompanying drawings, in which:

FIGS. 3, 4 and 5 are related sectional and broken away views of an alternative embodiment of the invention;

FIG. 6 is a top plan view, partially broken away, of a further exemplary embodiment of a vibration damper, in accordance with the invention;

FIG. 7 is a view in vertical section taken along line 7—7 of FIG. 6 and looking in the direction of the arrows, and showing additional details of an alternative exemplary means for resiliently supporting the vibratile mass in relation to a fixed reference base, in accordance with the invention;

Figure 1:
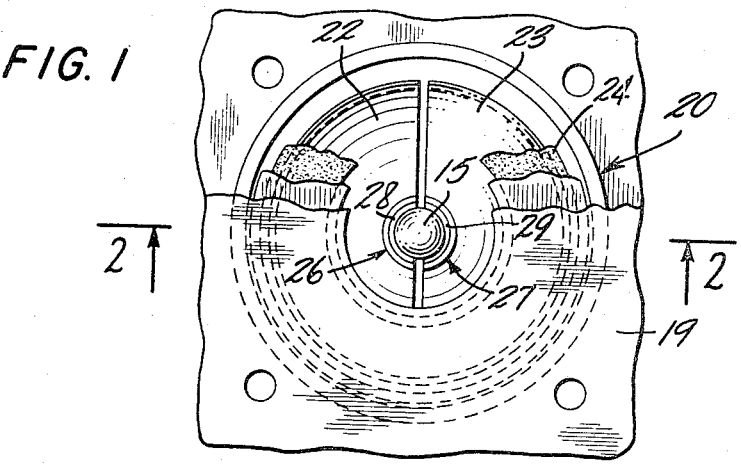
FIGURE 1 is a top plan view, partially broken away, of an exemplary embodiment of a vibration damper, in accordance with the invention.
Figure 2:
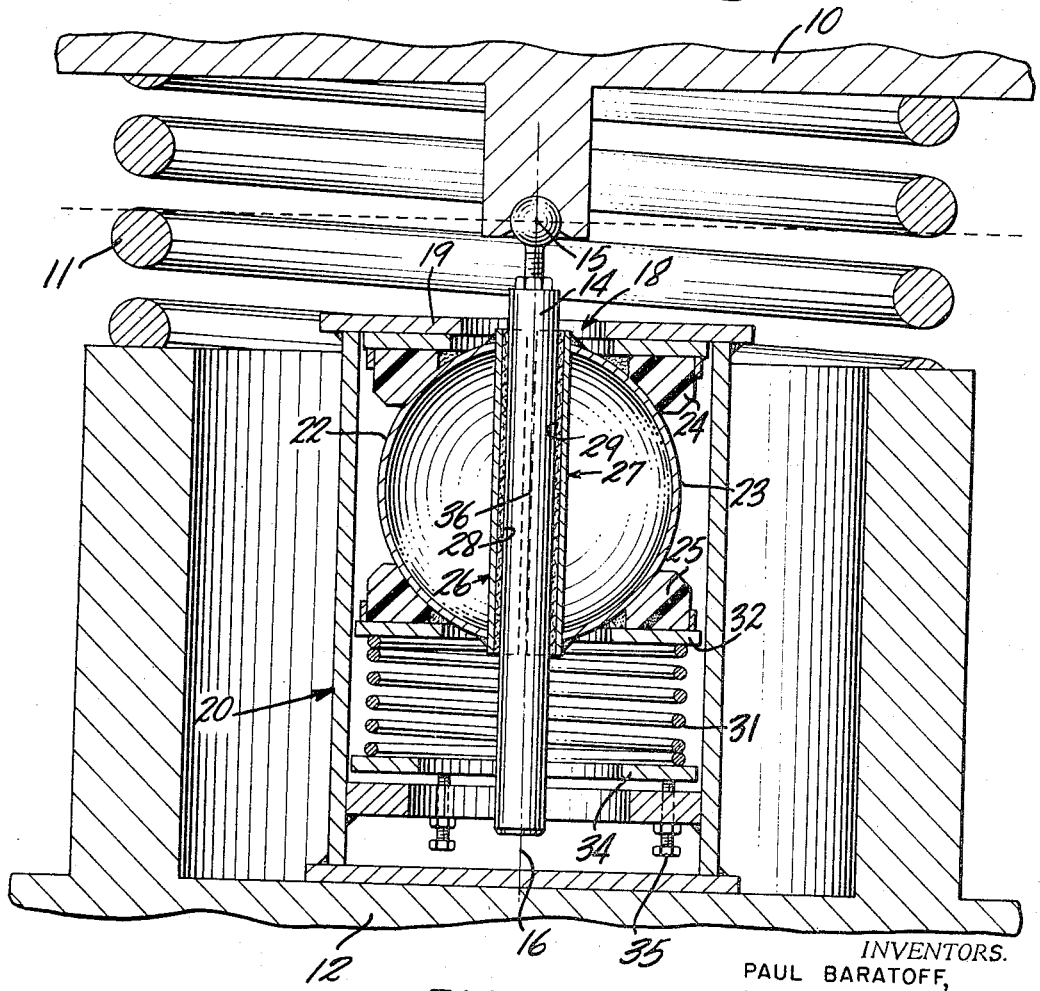
FIG. 2 is a view in vertical section taken along line 2—2 of FIG. 1 and looking in the direction of the arrows, and showing additional details of an exemplary means for resiliently supporting a vibratile mass in relation to a fixed reference base, in accordance with the invention.

In the embodiment of FIGS. 1 and 2, a vibratile mass 10 such as an instrument platform, a machine base, or the like is supported by means of a large diameter spring 11 suitably mounted as a combined spring-damper mount between the mass 10 and a relatively fixed base 12. The single spring 11 and the alternative plurality of springs as used in the embodiment of FIG. 7 have a conventional shock isolating function, but provide very little damping action, after being subjected to compression, extension, or lateral deformations. An elongated rigid rod 14, preferably of circular cross section, has one end pivotally mounted about a fixed point 15 on a depending portion of the vibratile mass 10 by any conventional form of all-directional pivot, such as a spherical bearing rod end or universal joint. The point 15 is adapted to lie in a plane passing through and including the elastic center of the support spring 11. The remainder of the rod 14 freely depends from the point 15, so that the longitudinal axis 16 of the rod 14 assumes a predetermined position (FIG. 2) in space when the vibratile mass 10 is at rest and is susceptible of angular displacement from that predetermined spatial position in any plane passing through and including the predetermined spatial position upon lateral displacement or movement of the vibratile mass 10 relative to the base 12.

The rod 14 freely passes through an aperture or circular opening 18 in the top plate 19 of a cylindrical housing 20 fixedly mounted in any suitable manner upon the reference base 12 and located inside of and about the center line of the spring 11.

A generally spherical damping means consisting of a plurality of rigid, spaced-apart spherical segments, viz, hemispherical segments 22 and 23, is supported in the housing 20 between a pair of annular friction means 24 and 25, which may be composed of any suitable friction material.

The hemispherical segments 22 and 23 are welded or otherwise suitably attached at their opposite ends to respective semi-cylindrical friction members 26 and 27 extending diametrically through the composite spherical damping means and enclosing a longitudinal extent of the rod 14. Suitably attached to each of the semi-cylindrical friction members 26 and 27 are respective semi-bushings 28 and 29 composed of conventional friction material for frictionally engaging the rod 14 under the influence of forces exerted on the hemispherical segments 22 and 23.

The damping forces in this embodiment are generated by a single compression spring 31, which may, for example, be steel or elastomeric, positioned between a retaining plate 32 underlying the annular friction means 25 and a compression plate 34. The force exerted by the spring 31 may be suitably adjusted by adjustment means 35 controlling the relative position of the compression plate 34 and the housing 20.

The force exerted by the spring 31 is directed through all points of contact between the annular friction means 24 and 25 and the contiguous surfaces of the hemispherical segments 22 and 23 in the direction normal to such surfaces. These normal forces on the hemispherical segments 22 and 23 are resolved into equal and opposite lateral forces directed inwardly upon the friction members 26 and 27 and in turn upon the rod 14. The axial components of the normal forces generated by the spring 31 are in balance and have substantially little effect on the damper action, whereas the friction forces generated at the contact of the rod 14 with the semibushings 28 and 29 of the friction members 26 and 27 seek to maintain the rod at rest and react against any axial displacement of the rod 14, thereby damping axially directed vibration components of the mass 10 at the point 15.

In any lateral displacement or movement of the mass 10 relative to the reference base 12, the position of the end of the rod 14 at the point 15 shifts laterally relative to the at rest axial position of the rod 14 and the rod 14 is angularly displaced from its predetermined at rest position, pivoting under the restraining influence of the spherical damping means about a point 36 at the radially inward center of rotation of the two hemispherical segments 22 and 23 located between the points at which the hemispherical segments bear upon the rod 14. The combined frictional forces generated in the spherical damping means at the points of contact with the friction means 24 and 25 oppose any angular displacement of the rod 14 and thereby dampen any lateral displacement of the point 15 on the vibratile mass 10.

In the alternative embodiment of a damper in FIGS. 3, 4 and 5, provision is made for the independent adjustment of lateral and axial damping forces exerted on the vibratile mass 10 at the point 15 by the reactive forces exerted on the rod 14.

The lateral damping force is generated by the action of a plurality of adjustable, spring loaded friction means 40 having arcuate surfaces of conventional friction material in frictional engagement with respective spaced-apart outer surface portions of a rigid spherical damping means 41.

Each of the friction means 40 comprises an arcuate back-up plate 42, a friction lining 43, and a suitable spring-driven compression rod assembly 45 in a housing 46. The housings 46 are each fixedly mounted, as by welding, for example, on respective inclined corner plates 47, which in turn are fixedly mounted in each of the interior corners of a generally cubical housing 49. The housing 49 consists of two spaced-apart halves or other suitable plurality of sections having opposed vertical flanges 50 and 51 separated by strips 52 of resilient elastomeric material, for example.

While it is intended that each of the spring-loaded friction means 40 be adjustable in any suitable conventional manner, a still further adjustment of the lateral damping force exerted as a frictional force on the surface of the spherical means 41 to prevent rotation about its center of rotation 54 is accomplished by suitable adjustment of conventional adjusting means 55, such as a nut and bolt, controlling the spacing between the two halves of the housing 49.

The spherical damping means 41 diametrically receives and encloses a longitudinal extent of the rod 14 and is adapted to bear upon it at two spaced-apart locations on opposite sides of the center of rotation 54 upon any angular displacement of the rod 14 in any direction. Apertures 56 and 57 in the top and bottom of the housing 49 freely permit such angular displacement.

The required axial damping force along the axis of the rod 14 is generated by two suitably adjustable spring-loaded friction means 59 and 60, of similar construction to the friction means 40, fixedly mounted, as by welding and suitable brackets, within the interior of the spherical damping means 41 and oppositely directed against the rod 14. The friction means 59 and 60 each include semi-cylindrical members 61 and 62 and respective semi-bushings 63 and 64 of suitable friction material conforming to the rod 14 and extending along a substantial longitudinal extent thereof.

Figure 8:
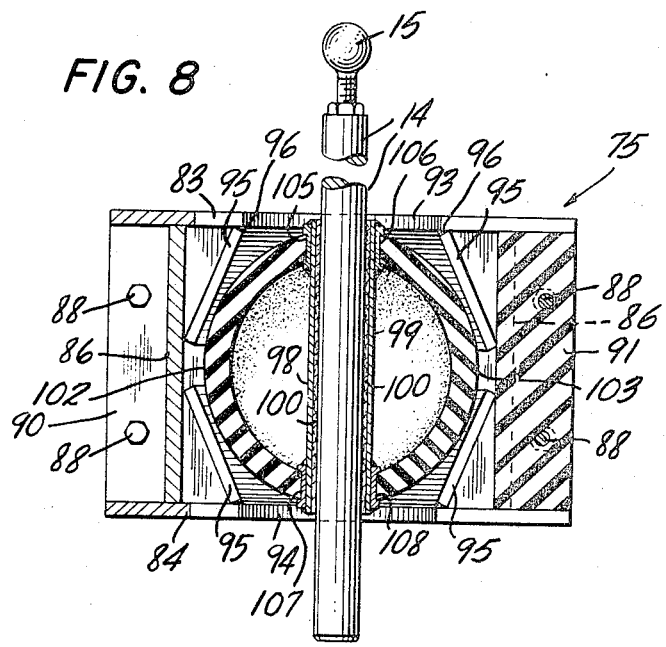
FIG. 8 is a sectional view taken along line 8—8 of FIG. 6 and looking in the direction of the arrows.

In the embodiment of FIGS. 6, 7 and 8, the vibratile mass 10 is alternatively supported by a plurality of compression springs 70 and 71 spaced about the damper and mounted upon suitable extensions of the reference base 73, if necessary, so that the point of action 15 of the vibratile mass 10 lies preferably in a plane passing through and including the elastic centers of the springs 70 and 71. The shaft 14 freely and pivotally depends from the point 15 on the vibratile mass 10.

A housing 75 of substantially rectangular configuration comprises four separate corner segments 78–81, forming a walled enclosure. Each corner segment 78–81 is provided with a top member 83 and a bottom member 84. The bottom member 84 is adapted to be directly supported by the base 73. Both the top and bottom members 83 and 84 are fixedly attached, for example, by welding at points designated as 85, to respective angle-shaped side walls 86. The four corner segments 78–81 are secured together to provide an enclosure by means of bolts 88, which pass through holes 89 in end flanges 90 formed by the side walls 86.

Resilient gaskets 91 are provided at the junction of the end flanges 90 where the segments 78–81 are bolted together. These gaskets 91 are made of a compressible material, such as elastic rubber. The gaskets 91 and the bolts 88 provide adjustable means for varying the relative position of the corner segments 78–81. When the bolts 88 are tightened, compressing gaskets 91, the corner segments 78–81 translate towards each other, whereas when the bolts 88 are loosened, the resilient gaskets 91 urge the corner segments 78–81 away from each other.

The housing 75 is provided with two apertures 93 and 94 in its top and bottom members 83 and 84, respectively. There are eight inclined corner force plates 95, four of which depend from the top member 83 and four of which are joined to the bottom member 84 of the housing 75 at positions adjacent to the openings 93 and 94 by welding beads 96.

Disposed within the housing 75, adjacent to the circular rod 14, there are two semi-cylindrical friction members 98 and 99, each having a semibushing 100 composed of a conventional friction material, such as that used for automotive brake linings, suitably attached thereto. Each semibushing 100 is formed with a complementary arcuate surface which engages the cylindrical surface of the rod 14 at locations along the longitudinal extent thereof and exerts a frictional drag upon the rod 14 in opposition to any movement of the rod in an axial direction.

Channel members 105 and 106, and 107 and 108 are fixedly attached to respective friction members 98 and 99 at spaced-apart positions, adjacent the apertures 93 and 94.

Segmental members 102 and 103, of substantially hemispherical configuration, are formed of a suitable resilient material, such as rubber, and provide the means for urging the semibushing 100 of the friction members 98 and 99 against the cylindrical surface of the rod 14. The oppositely disposed peripheral end portions of the members 102 and 103 bear against the friction members 98 and 99 at the two spaced-apart locations along the longitudinal extent of the rod 14 formed by the channel members 105–108, and are fixed within the channel members 105–108 by a suitable high strength adhesive, for example.

The resilient hemispherical members 102 and 103 maintain a substantially constant frictional engagement between the semibushings 100 of the friction members 98 and 99 and the rod 14 by exerting a compressive force on the friction members 98 and 99. The amount of the compressive force exerted is determined by the amount of force which the inclined corner plates 95 exert in turn upon the hemispherical members 102 and 103, the corner force plates 95 also being in frictional engagement with contiguous surfaces of the hemispherical members 102 and 103 so as to exert a frictional drag on any rotation thereof. The load rate of the resilient shock absorbing members 102 and 103 can be varied, for example, by using rubber materials of different hardness and thickness.

Adjustment of the damping forces is accomplished by tightening the bolts 88, which cause the inclined corner plates 95 to be translated towards or away from the rod 14, thereby compressing or releasing the hemispherical members 102 and 103. The hemispherical members 102 and 103, in turn acting upon the friction members 98 and 99 at the locations of the spaced-apart channel members 105–108, determine the amount of frictional forces exerted by the semibushings 100 on the rod 14 to oppose axial displacement thereof. The frictional engagement of the hemispherical members 102 and 103 with the inclined corner plates 95 opposes any rocking movement or angular displacement of the rod 14, thereby damping any lateral movement or displacement of the point 15, attenuating the possible lateral vibrations that may be induced in the vibratile mass 10.

For example, if a shock input is exerted upon the mass 10, the resulting vibrations established therein and at the point 15 may be resolved into two major components, one of which appears as an axial displacement or movement of the rod 14 and the other of which appears as a lateral movement of the point 15 relative to the reference base. Assuming the lateral component is directed towards the left in FIG. 7 and the axial component is directed vertically downward, the rod 14 will have a tendency to rotate or rock in a counter-clockwise manner, with the channel member 105 being driven into the top peripheral portion of the hemispherical member 102, whereas the channel member 108 will be driven into the lower peripheral portion of the hemispherical member 103. A clockwise frictional damping force is then exerted at each point of contact of the hemispherical members 102 and 103 with the corner force plates 95 and quickly attenuates all lateral vibrations. The axial movement of the shaft 14 is dissipated by the frictional drag exerted by the semibushings 100 on the cylindrical surface of the rod 14. Thus vibrations occurring in any direction are resisted and dissipated.

Figure 9:
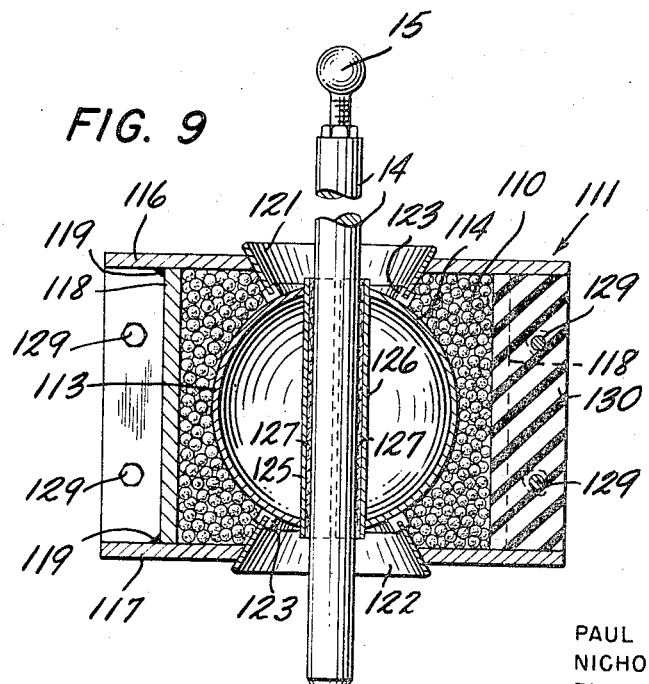
FIG. 9 is a sectional view of a still further alternate exemplary embodiment of a vibration damper, in accordance with the invention.

In FIG. 9, the damping forces are generated by a resilient fill 110, provided within an enclosed housing 111. The fill 110, which may be composed of a plurality of resilient rubber balls, acts compressively on relatively rigid hemispherical members 113 and 114. The enclosure is formed by a top 116, a bottom 117, and side walls 118 of housing 111, the top and bottom housing segments 116 and 117 being welded to the side walls 118 at points 119.

The top and bottom segments 116 and 117 extend inwardly towards the centrally disposed rod 14, which is freely and pivotally mounted about the point 15 on the vibratile mass 10 by an all-directional pivot, and engage respective conically shaped deflector members 121 and 122. Each of the deflectors 121 and 122 is of frusto-conical shape, and forms an aperture in the housing for freely receiving the circular rod 14.

Ring shaped gasket elements 123 are respectively fixed to each deflector member 121 and 122 and slidably engage the outer surface of the hemispherical members 113 and 114, thereby serving to confine the fill 110 within the enclosure of the housing 111. In this embodiment, the walls of the housing 111 bear directly against the fill 110 generating damping force couples, which act at the surface of the hemispherical members 113 and 114, and forcing or urging the hemispherical members 113 and 114 against respective friction members 125 and 126 in engagement with a longitudinal extent of the rod 14. The hemispherical members 113 and 114 act upon the friction members 125 and 126 at two spaced-apart locations adjacent the conical deflectors 121 and 122. Respective semi-cylindrical members 127 composed of a suitable friction material are fixedly attached to each of the friction members 125 and 126, and are adapted to frictionally engage the peripheral surface of the rod 14 and dampen movement in an axial direction.

Adjustment of the damping forces and couples exerted upon the rod 14 is accomplished by means of a plurality of bolts 129, which serve to compress respective resilient gasket members 130 in the same manner as described with respect to earlier embodiments. When the bolts 129 are tightened, the resilient fill 110 is placed under greater compression and in turn bears against the relatively rigid hemispherical members 113 and 114, which may, for example, be metallic, thereby causing greater damping friction couples at the surfaces of the hemispherical members and forcing the semibushings 127 to exert a greater frictional drag on the rod 14.

Thus there is provided, in accordance with the invention, novel and improved apparatus for simultaneously damping vibrations in all directions which are adaptable for heavy duty service for damping powerful vibrations of substantial amplitude, as well as for use with light machinery, laboratory equipment, and the like.

It will be understood by those skilled in the art that the above described embodiments are meant to be merely exemplary and that they are susceptible of modification and variation without departing from the spirit and scope of the invention. For example, while two hemispherical segmental members are shown in the illustrative embodiments, a greater number of spherical segmental members in the form of quarter or third spherical segments may be used along with respective friction members, which in combination will constitute a substantially spherical damping means. Therefore, the invention is not deemed to be limited except as defined in the appended claims.

We claim:

1. A vibration damper for damping vibrations in a vibratile mass relative to a fixed reference base, comprising an elongated rigid rod having one end pivotally mounted about and the remainder thereof freely depending from a fixed point on the vibratile mass and having a longitudinal axis adapted to assume a predetermined position in space relative to the vibratile mass when the vibratile mass is at rest and susceptible of angular displacement from said predetermined spatial position in any plane passing through and including said predetermined spatial position upon lateral displacement of the vibratile mass relative to the fixed reference base, a generally spherical damping means enclosing and diametrically receiving a longitudinal extent of said rod spaced from said one end for frictionally damping axial displacement of said rod relative to the fixed reference base, said spherical damping means being susceptible of rotation about a radially inward center of rotation and adapted to engage at least two spaced-apart points on said longitudinal extent of said rod respectively positioned on opposite sides of said center of rotation, and means for frictionally restraining rotation of said spherical damping means about said center of rotation to dampen angular displacement of said rod from said predetermined spatial position.

2. A vibration damper as claimed in claim 1, further comprising spring means mounted between said reference base and said vibratile mass for supporting said vibratile mass relative so said reference base, said fixed point being positioned in a plane passing through the elastic center of said spring means.

3. A vibration damper for damping vibrations in a vibratile mass relative to a fixed reference base, comprising an elongated rigid rod having one end pivotally mounted about and the remainder thereof freely depending from a fixed point on the vibratile mass and having a longitudinal axis adapted to assume a predetermined position in space relative to the vibratile mass when the vibratile mass is at rest and susceptible of angular displacement from said predetermined spatial position in any plane passing through and including said predetermined spatial position upon lateral displacement of the vibratile mass relative to the fixed reference base, a generally spherical damping means enclosing and diametrically receiving a longitudinal extent of said rod spaced from said one end for frictionally damping axial displacement of said rod relative to the fixed reference base, said spherical damping means being susceptible of rotation about a radially inward center of rotation and adapted to engage at least two spaced-apart points on said longitudinal extent of said rod respectively positioned on opposite sides of said center of rotation, a housing enclosing said spherical damping means and fixedly mounted on said reference base having at least one aperture therein for freely receiving a portion of said depending rod, and means mounted in said housing for supporting said spherical damping means and for frictionally restraining rotation of said spherical damping means about said center of rotation to dampen angular displacement of said rod from said predetermined spatial position.

4. A vibration damper as claimed in claim 3, wherein said generally spherical damping means includes a plurality of spaced-apart rigid spherical segments having friction members disposed about said rod and adapted to be urged into frictional engagement with said rod at locations along said longitudinal extent thereof, said supporting and restraining means including annular friction means resiliently mounted in said housing for frictionally engaging portions of the outer surfaces of each of said spherical segments.

5. A vibration damper as claimed in claim 4, wherein said annular friction means includes a pair of spaced-apart annular members positioned in said housing on opposite respective sides of a transverse plane passing through said center of rotation, adjustable spring means for urging at least one of said annular members into frictional engagement with said spherical segment.

6. A vibration damper as claimed in claim 3, wherein said generally spherical damping means includes a rigid hollow sphere and adjustable spring-loaded friction means mounted in the interior of said sphere and adapted to be urged into frictional engagement with said rod at locations along said longitudinal extent thereof.

7. A vibration damper as claimed in claim 3, wherein said supporting and restraining means comprises a plurality of spring-loaded arcuate friction members fixedly mounted in said housing at spaced-apart locations about said spherical damping means and adapted to frictionally engage spaced-apart portions of the surface of said spherical damping means.

8. A vibration damper as claimed in claim 3, wherein said generally spherical damping means includes a rigid hollow sphere and adjustable spring-loaded friction means mounted in the interior of said sphere and adapted to be urged into frictional engagement with said rod at locations along said longitudinal extent thereof, and said supporting and restraining means comprises a plurality of spring-loaded arcuate friction members fixedly mounted in said housing at spaced-apart locations about said hollow sphere and adapted to engage spaced-apart portions of the surface of said hollow sphere.

9. A vibration damper as claimed in claim 8, wherein said housing is generally rectangular in form and has a plurality of interior corners, further comprising means for mounting a respective one of said spring-loaded arcuate friction members in each of said interior corners, and wherein said adjustable spring-loaded friction means mounted in the interior of said sphere comprises a plurality of means disposed about said rod in opposing relation to produce an axial restraining force on said rod.

10. A vibration damper as claimed in claim 3, wherein said spherical damping means comprises a plurality of friction members positioned about and adapted to be brought into frictional engagement with said rod at at least said two spaced-apart points and a resilient spherical member coupled to said friction members for controlling the frictional engagement thereof with said rod as a function of compressive forces exerted on said resilient spherical member, said housing comprising a plurality of spaced-apart wall segments fastened together to provide a walled enclosure of variable dimension, said supporting and restraining means comprising a plurality of rigid inclined force plates fixedly mounted on respective ones of said wall segments and adapted to frictionally engage respective portions of the outer surface of said resilient spherical member, and means for adjusting the relative position of said wall segments to selectively produce compressive forces on said spherical member.

11. A vibration damper as claimed in claim 3, wherein said generally spherical damping means comprises a plurality of spaced-apart rigid spherical segments having respective friction members engaging at least said two spaced-apart points on said longitudinal extent of said rod, said housing having a plurality of spaced-apart wall segments fastened together and forming with said spherical segments a walled enclosure substantially surrounding said spherical segments, said supporting and restraining means comprising resilient fill disposed in said enclosure, and means for adjusting the relative position of said wall segments for varying the frictional and compressive forces exerted on said spherical damping means.

No references cited.

ARTHUR L. LA POINT, *Primary Examiner.*

R. M. WOHLFARTH, *Assistant Examiner.*